O. J. LEABO.
Improvement in Harrow.
No. 124,752. Patented March 19, 1872.
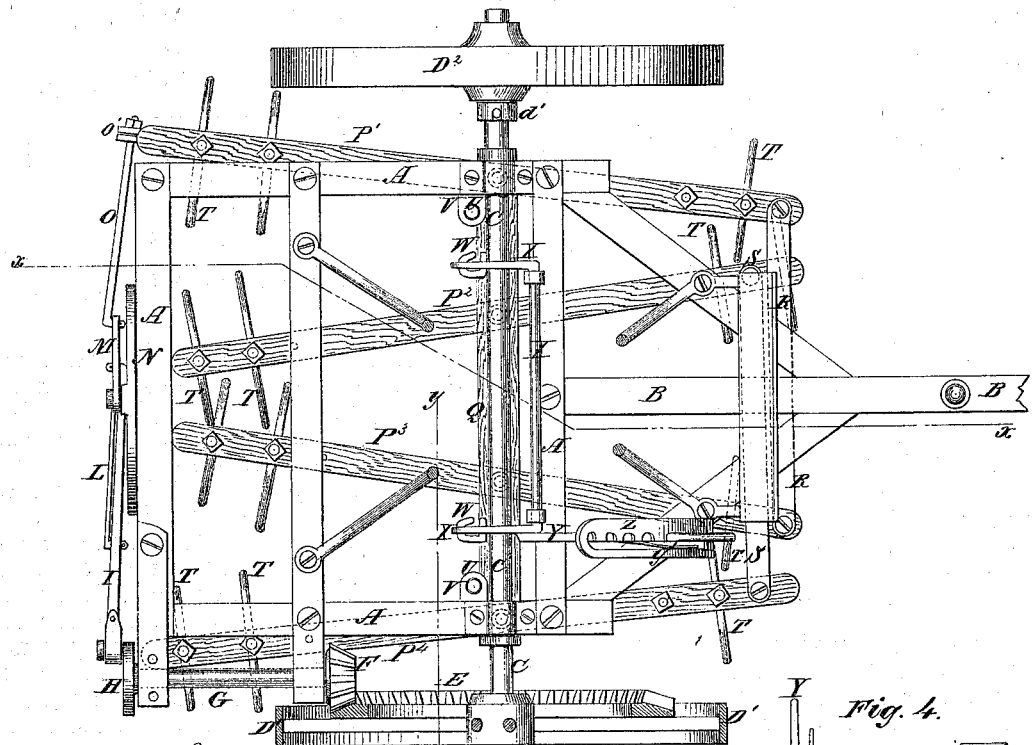
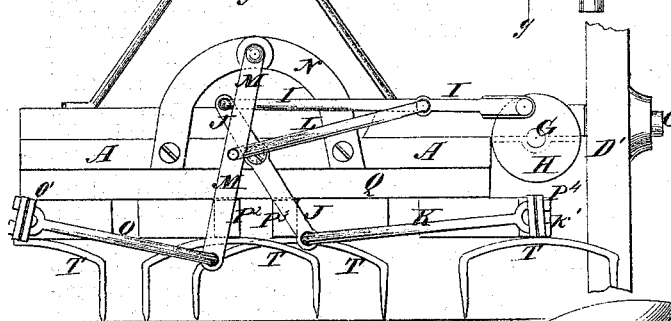
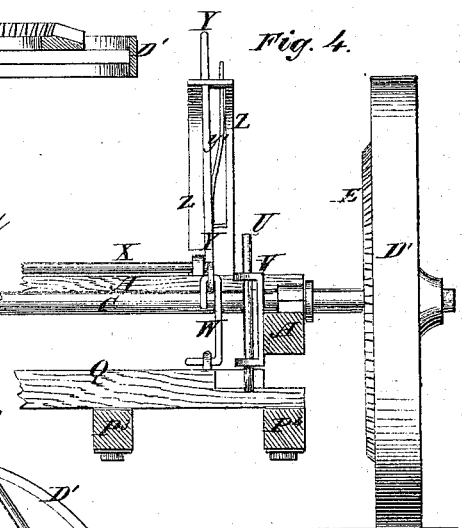
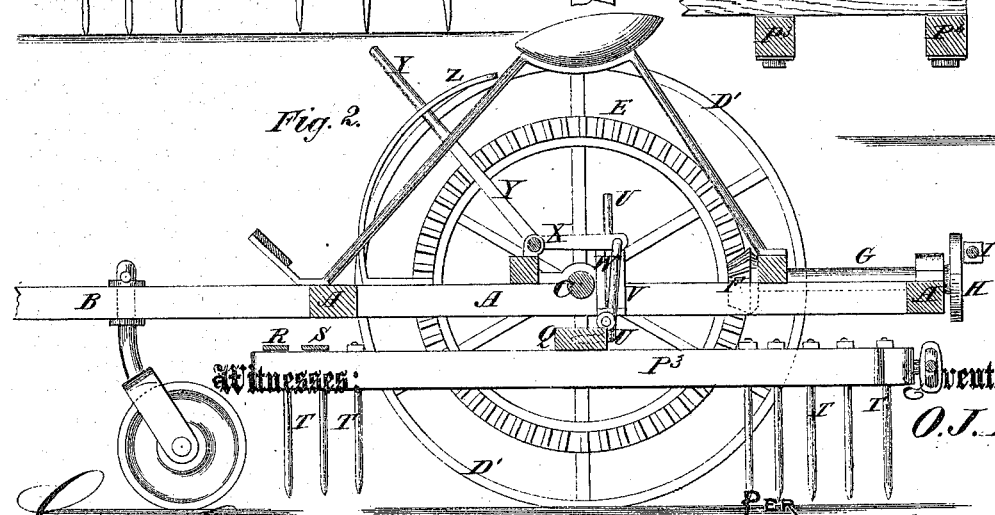
Witnesses:
Gustave Dieterich
Francis McArdle
Inventor:
O. J. Leabo
Attorneys.

124,752

UNITED STATES PATENT OFFICE.

ORADON J. LEABO, OF FOREST GROVE, OREGON.

IMPROVEMENT IN HARROWS.

Specification forming part of Letters Patent No. 124,752, dated March 19, 1872.

*To all whom it may concern:*

Be it known that I, ORADON J. LEABO, of Forest Grove, in the county of Washington and State of Oregon, have invented a new and useful Improvement in Harrows; and I do hereby declare that the following is a full, clear, and exact description thereof, which will enable others skilled in the art to make and use the same, reference being had to the accompanying drawing forming part of this specification.

Figure 1 is a top view of my improved harrow, the seat being removed. Fig. 2 is a detail vertical section of the same taken through the line $x\ x$, Fig. 1. Fig. 3 is a rear-end view of the same. Fig. 4 is a detail section taken through the line $y\ y$, Fig. 1.

Similar letters of reference indicate corresponding parts.

My invention has for its object to furnish an improved harrow, which shall be so constructed that the harrow-teeth may cross their own furrows at a single time passing over the ground, giving the ground a better cross-harrowing on passing over the ground once than an ordinary harrow will give it in passing over the ground twice; and it consists in the construction and combination of the various parts of the harrow, as hereinafter more fully described. A is the frame of the machine, to the forward part of which the tongue B is attached, and in bearings attached to which the axle C revolves. $D^1\ D^2$ are the wheels, one of which, $D^1$, is rigidly attached to the axle C, the other, $D^2$, is connected with said axle by a spring-clutch, $d'$, so that it may turn back freely, for convenience in turning, but which, when turned forward, will carry the said axle C with it. To the wheel $D^1$ is attached, or upon it is formed, a gear-wheel, E, the teeth of which mesh into the teeth of a small gear-wheel, F, attached to the forward end of a shaft, G. The gear-wheel F may be connected with the shaft G by a sliding clutch, so that it may be thrown into and out of gear as required. The shaft G revolves in bearings attached to the frame A, and to its rear end is attached a small crank, H, to the crank-pin of which is pivoted the outer end of a connecting-rod, I, the other end of which is pivoted to the center of the rear cross-bar of the frame A. To the lower end of the lever J is pivoted the inner end of the connecting-rod K, the outer end of which is pivoted to the rear of the outer harrow-bar by means of the coupling $K'$. To the connecting-rod I is pivoted the outer end of the connecting-rod L, the inner end of which is pivoted to the middle part of the lever M, the upper end of which is pivoted to an arm, bar, or bracket, N, attached to the rear cross-bar of the frame A. To the lower end of the lever N is pivoted the inner end of the connecting-rod O, the outer end of which is pivoted to the rear end of the outer harrow-bar, by means of the coupling $o'$. The outer ends of the rods K and O are made forked, which forks pass through holes in the ends of two short bars or yokes, which have a circular recess formed in their adjacent faces, half of said recess being formed in each bar, said recess being intended to receive the rounded or ball-shaped head of a pin attached to the rear ends of the outer harrow-bars. $P^1\ P^2\ P^3\ P^4$ are the harrow-bars, four or more of which should be used, and which are pivoted at or near their middle points to the lower side of the cross-bar Q, so that the said harrow-bars $P^1$—$P^4$ may have a free lateral movement upon said cross-bar. The two outer bars $P^1\ P^4$ are oscillated as the machine is drawn forward, by the arrangement of rods and levers just described. The forward end of the outer bar $P^1$ is connected with the forward end of the inner bar $P^3$ by a connecting-rod or bar, R; and the forward end of the outer bar $P^4$ is connected with the forward end of the other inner bar $P^2$ by the rod or bar S, so that the inner bars may be oscillated by the oscillation of the outer bars. By this arrangement the adjacent bars will always be moving in opposite directions, and the alternate bars in the same direction. To the forward and rear-end parts of the harrow-bars $P^1\ P^2\ P^3\ P^4$ are attached one or more forked or staple-shaped teeth, T, at the center of the upper or horizontal part of said teeth, as shown in the drawing, so that, as the harrow is drawn forward and the harrow-bar oscillated, the said teeth may move through the ground in a zigzag path, crossing each other's furrows continuously. Straight teeth may also be attached to the harrow-bars, if desired. To the cross-bar Q, near its ends, are attached guide-rods U, which project upward and through holes in arms or brackets V attached to the side-bars of the frame A, so that the harrow-bars may be raised and lowered squarely and all at the same time. To the cross-bar Q, near its ends, are pivoted the lower ends of two links, chains, or rods, W, the upper ends of which are pivoted to the ends of the arms of the crank-lever X, which is pivoted to the frame A, and to which is rigidly attached a lever, Y, which projects forward into such a position that it may be conveniently operated by the driver with either his hand or foot. The lever Y is held into any position into which it may be adjusted by a slotted and notched or toothed arm, Z, through the slot of which it passes and into the notches or teeth of which it is held by a spring, $y'$, attached to the lever Y and pressing against the smooth side of the slot of the said arm Z.

Having thus described my invention, I claim as new and desire to secure by Letters Patent—

The two or more pairs of bars, $P^1$ $P^2$ $P^3$ $P^4$, pivoted in the middle under frame A and provided with teeth at each end, combined. as described, through rods K O, with bars M M attached to a reciprocating pitman, I, as and for the purpose described.

ORADON J. LEABO.

Witnesses:
S. HUGHES,
L. C. WALKER.